United States Patent [19]

Walz

[11] Patent Number: 4,501,073
[45] Date of Patent: Feb. 26, 1985

[54] APPARATUS AND METHOD FOR DEHYDRATING METAL PIECES

[75] Inventor: Mark J. Walz, Northboro, Mass.

[73] Assignee: Nuclear Metals, Inc., Concord, Mass.

[21] Appl. No.: 460,647

[22] Filed: Jan. 24, 1983

[51] Int. Cl.[3] .......................... F26B 3/00; F26B 19/00; C21D 1/62; F27B 15/00

[52] U.S. Cl. ............................................. 34/9; 34/69; 266/132; 432/197

[58] Field of Search .................. 34/9, 44, 69; 432/197; 266/132

[56] References Cited

U.S. PATENT DOCUMENTS

| 1,425,660 | 8/1922 | Josephs et al. | 266/132 |
|---|---|---|---|
| 1,467,670 | 9/1923 | Josephs et al. | 266/132 |
| 2,975,083 | 3/1961 | Engelhard | 261/132 |
| 3,888,693 | 6/1975 | Schevey et al. | 34/9 |
| 4,090,370 | 5/1978 | Gollmick et al. | 34/9 |
| 4,377,039 | 3/1983 | Hager | 34/9.5 |

FOREIGN PATENT DOCUMENTS 2708103  9/1977  Fed. Rep. of Germany ...... 266/132

Primary Examiner—John J. Camby
Attorney, Agent, or Firm—Joseph S. Iandiorio; William E. Noonan

[57] ABSTRACT

A method of dehydrating metal pieces including immersing the pieces in an oil heated to or above the boiling point of water for a time to boil off the water and then removing the pieces from the oil. An apparatus for the dehydration of metal pieces includes a container for carrying the pieces to be dehydrated, a receptacle for holding oil in which the chips are to be immersed, means for heating the oil to or about the boiling point of water, and means for introducing the container into the receptacle to immerse the pieces in the oil and removing the container and pieces from the oil.

27 Claims, 4 Drawing Figures

APPARATUS AND METHOD FOR DEHYDRATING METAL PIECES

FIELD OF INVENTION

This invention relates to an apparatus and method for removing water from metal pieces.

BACKGROUND OF INVENTION

Uranium is machined much as other metals for a variety of purposes. The scraps or chips of uranium created by machining present a disposal problem: because of the nature of uranium the chips cannot be simply discarded as other less chemically active metals. Further, the cost of uranium metal and the cost of disposal of it make the recovery and recycling of the chips extremely attractive.

Because uranium readily ignites and burns, oil is not favored as a lubricant in machining. Typically a water-based lubricant is used, but this introduces another set of problems. Most reprocessing techniques for uranium use heat and vacuum. But uranium reacts with water in the presence of heat to form free hydrogen, which presents the very real potential for fierce hydrogen fires and explosions. Centrifuges do not remove enough of the water to solve the problem. Introducing the chips into a melt is also unsatisfactory because of the danger that the water carried by the chips will turn to steam in the melt and cause an explosion and because the steam can break into hydrogen and oxygen, causing even more violent explosions. Further, the presence of water in vacuum melting furnaces prevents the attainment of adequate vacuum levels necessary for safe melting. Pieces of similar metals such as magnesium, titanium, zirconium and other metals in the shape of chips, scraps or other forms suffer from similar problems.

SUMMARY OF INVENTION

It is therefore an object of this invention to provide an improved apparatus and method for thoroughly and safely removing water from metal pieces.

It is a further object of this invention to provide an apparatus and method for dehydrating metal pieces which greatly reduces the risk of explosion and fire during reprocessing of the metal.

It is a further object of this invention to provide an apparatus and method for dehydrating metal pieces which permits large quantities of the metal to be efficiently and rapidly reprocessed and re-used.

This invention results from the realization that water may be removed from metal pieces in an effective and safe manner by immersing the metal in an oil, and in particular a vegetable oil, heated to above the boiling point of water so as to boil the water off of the pieces.

This invention therefore features an apparatus for dehydrating metal pieces, including a container for carrying pieces to be dehydrated. A receptacle is provided for holding oil in which the pieces are to be immersed. There are means for heating the oil in to the boiling point of water, and means for introducing the container into the receptacle to immerse the pieces in the oil and for removing the container from the oil.

In a preferred embodiment, the container may be foraminous. The means for introducing may include means for raising and lowering the container, and further may include means for advancing the container beyond the receptacle after it is raised out of the receptacle. Means may be provided for timing the oil immersion period when the container is in the lowered position in the receptacle, and means may also be provided for timing the drainage period when the container is in the raised position above the receptacle.

At least one additional receptacle may be provided for holding a solvent for removing the oil from the metal pieces. The means for introducing may further introduce the container into and remove it from each additional receptacle for holding solvent. A housing may surround the container and at least one receptacle. Venting means may be included for removing air from the housing.

The means for introducing may include elevating means for raising and lowering the container and indexing means for advancing the container between receptacles. Such receptacles may be arranged in a circular path, and the means for indexing may provide rotational motion. The oil may be a vegetable oil, and the oil removing solvent may include trichloroethane.

This invention further features an apparatus for dehydrating metal pieces including a number of containers for carrying pieces to be dehydrated. A receptacle is provided for holding oil in which the pieces are to be immersed. There are means for heating the oil to the boiling point of water. At least one additional receptacle is provided for holding a solvent for removing the oil from the pieces, and there are means for introducing each container into the receptacle holding the oil and sequentially into each additional receptacle holding the solvent.

A method of dehydrating metal pieces is also featured, including introducing the pieces into an oil heated to the boiling point of water to boil off the water, and removing the pieces from the oil. In a preferred embodiment the pieces may be introduced at least once into an oil-removing solvent to remove the oil from the pieces, and then may be removed from the solvent. The pieces may be drained before introducing them into such a solvent, and they may be drained after they are removed from the solvent. The pieces may be dried of solvent following removal therefrom. In the method of this invention, the oil may be vegetable oil and the solvent may be trichloroethane.

DISCLOSURE OF PREFERRED EMBODIMENT

Other objects, features and advantages will occur from the following description of a preferred embodiment and the accompanying drawings, in which.

An apparatus for dehydrating metal, e.g. uranium, magnesium, titanium and zirconium, chips, according to this invention may be effected using a container for carrying the chips to be dehydrated. A receptacle is provided for holding an oil such as vegetable oil in which the chips are to be immersed. Means are provided to heat the oil to the boiling point of water. Means are also provided for introducing the container into the receptacle to immerse the chips in the oil and for removing the container from the oil.

A basket or other foraminous container is utilized to accommodate the chips. Typically, at least one additional receptacle is utilized for holding a solvent for removing the oil from the chips. A preferred solvent is trichloroethane. In such embodiments the means for introducing introduces the chip-carrying container into and removes it from each additional solvent-holding receptacle.

A housing typically surrounds the container and at least one receptacle. Venting means may be provided for removing air from the housing.

It is preferred that the container be raised from and lowered into each receptacle and that such container be advanced beyond the receptacle out of which it has been raised. Elevating means are typically provided for raising and lowering a container, and indexing means are utilized for advancing the container between receptacles. In such embodiments the receptacles are preferably arranged in a circular path and the means for indexing provides rotational motion. Means may be provided for timing the immersion period during which the container is in the lowered position in an oil or solvent holding receptacle. Timing means may also be provided for timing the drainage period during which the container is in the raised position. Preferably the immersion period ranges from one to three minutes and the drainage period ranges from ten to thirty seconds.

This invention may also utilize a number of chip-carrying containers. Means may be provided for introducing each of the containers into and removing it from the oil-holding receptacle and each additional solvent-holding receptacle.

A method for dehydrating metal chips according to this invention includes introducing the metal chips into an oil heated to the boiling point of water to boil off water from the chips. Under atmospheric pressure conditions any temperature above 212 degrees Farenheit may be adequate, although a preferred temperature is approxiamtely 300–320 degrees Farenheit. The chips may then be removed from the oil. The chips may subsequently be introduced into an oil-removing solvent such as trichloroethane to remove the oil from the chips. The chips are typically drained of oil prior to introduction into the solvent and drained of solvent after removal therefrom. The chips may be dried after removal from such solvent.

Figure 1:
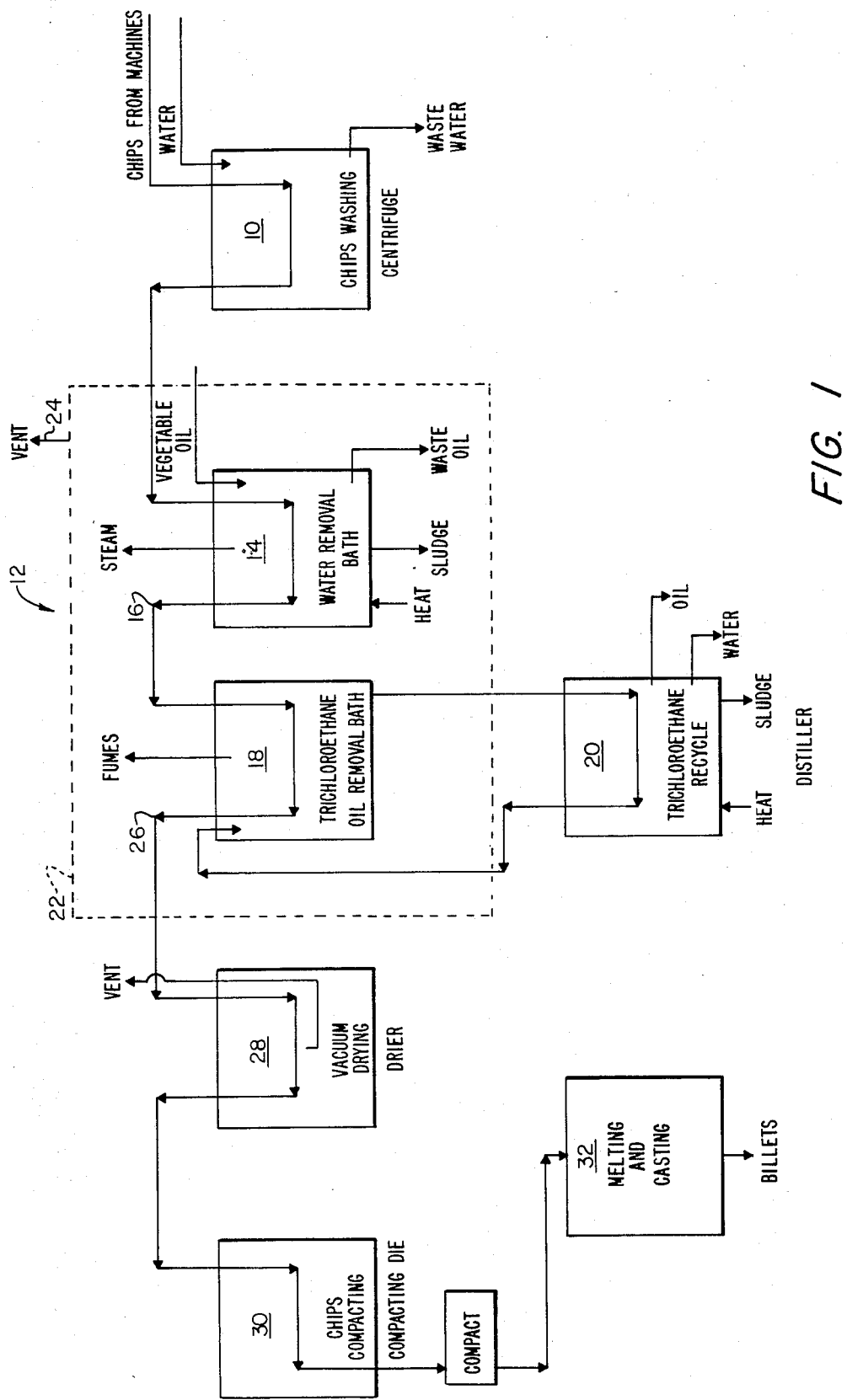
FIG. 1 is a schematic of a method for recycling metal pieces including the method for dehydrating such metal pieces according to this invention.

There is shown in FIG. 1 a method for reprocessing uranium chips, including a method for dehydrating such chips according to this invention. Machined and lubricated uranium chips are introduced into a centrifuge 10, where they are washed in water and thereafter centrifuged to remove excess water. Clean water is periodically or continuously added to centrifuge 10 to offset the waste water removed therefrom.

The chips are then introduced into a dehydrating apparatus 12 according to this invention, wherein they are placed into a vegetable oil bath 14 which is heated to at least the boiling point of water, e.g. at normal atmospheric pressure 212 degrees Farenheit. Water on the chips is thus boiled off as steam. Sludge and waste oil are regularly removed from the oil bath 14, and the bath may be replenished with fresh vegetable oil. The chips are then removed from the bath, drained of excess oil such as at 16, and introduced into one or more oil-removing trichloroethane solvent baths 18, whereby the oil is removed from the chips. The trichloroethane solvent may be recycled such as by distiller 20. Used solvent is recycled to separate sludge, oil and water therefrom and then is returned to the oil-removing process.

The vegetable oil and solvent baths 14, 18 of apparatus 12 are enclosed by a housing 22. Vent 24 is provided to remove air from the housing. In this manner, steam emitted as water is boiled from the chips and solvent fumes emitted by solvent baths 18 are removed from inside housing 22.

Following oil removal, the chips are allowed to drain such as at 26 and are removed from apparatus 12, where they are vacuum dried of solvent in dryer 28. The chips are then compacted by compacting die 30 and melted and recast at 32 for re-use as metal billets.

Figure 2:
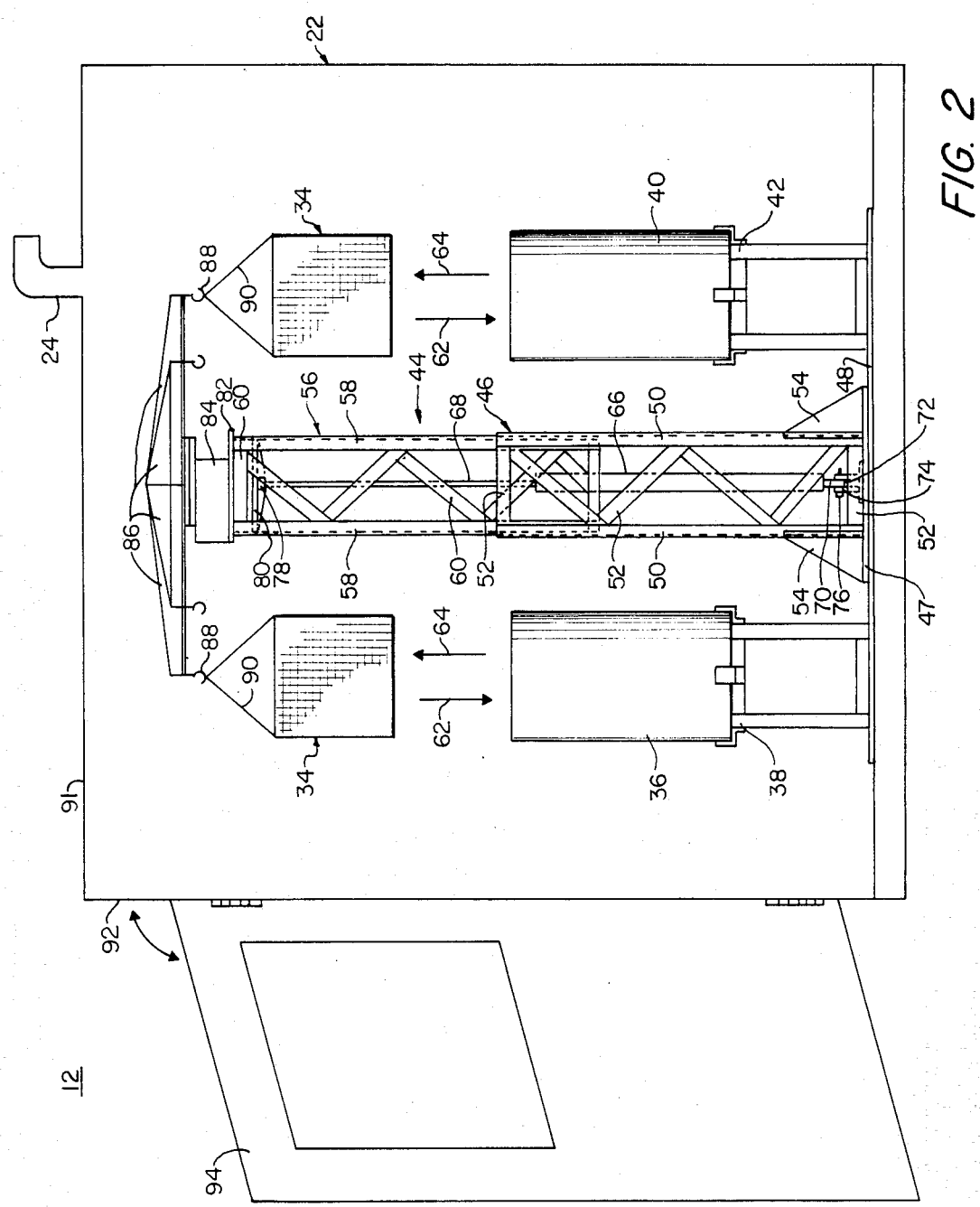
FIG. 2 is an elevational, partly schematic view of an apparatus for dehydrating metal pieces according to this invention.

Apparatus 12 is illustrated alone in FIG. 2. The metal chips to be dehydrated are accommodated in foraminous containers such as baskets 34. A typical basket may contain approximately ten pounds of chips. A receptacle 36 for carrying the vegetable oil bath 14 is seated on a bench 38, and additional receptacles 40, only one of which is shown for clarity, for holding the trichloroethane solvent bath are seated upon additional benches 42. The receptacles are arranged circularly about a carousel device 44.

Carousel 44 is provided to introduce each basket 34 sequentially into first, oil-holding receptacle 36, and then each solvent-holding receptacle 40. A lower tower portion 46 having a rectangular cross section is mounted to a base plate 47 which is in turn mounted to the floor or base 48. Tower portion 46 includes four vertical supports 50, one at each corner. Note that two of the supports are obscured by the supports 50 which are shown. Top and bottom horizontal cross braces and diagonal cross braces 52 are connected such as by welding or unpictured bolts and nuts between each pair of supports 50. Wings 54 are connected at the bottom of each support 50 to stabilize tower portion 46 on base plate 47. A similarly structured upper tower portion 56, including vertical supports 58 and horizontal and diagonal cross braces 60 attached therebetween, has a rectangular cross section conforming to but narrower than the lower tower portion 46. Tower portion 56 is thereby slidably receivable within tower portion 46 and able to be raised and lowered therein in the direction of arrows 62 and 64.

A cylinder housing 66 which accommodates an obscured piston attached to a connecting rod 68 is mounted to base plate 47 inside of tower portions 46 and 56 and extends upwardly therefrom. A mounting element 70 at the lower end of cylinder housing 66 fits within a slot 72 in a yoke 74, which is attached in any acceptable manner to base plate 47. A bolt 76 fits through obscured cooperating holes in the yoke 74 and mounting element 70 to connect these chips. The upper end of connecting rod 68 is fitted within a receptacle 78, which extends from a plate 80 that fits inside of tower portion 56 and is attached by welding or other conventional means to the four supports 58 thereof. By raising or lowering the obscured piston within cylinder housing 56 in a manner described hereinafter, upper tower portion 56 is raised and lowered relative to lower tower portion 46. A top plate 82 sits atop upper tower porton 56 and is attached, such as by welding, to the supports 58 thereof. An index table 84 is rotatably mounted to top plate 82, and a radial arrangement of six support arms 86 (two of which are obscured) are mounted to the top of index table 84. The distal end of each arm has a hanger hook 88 attached thereto. A chip-carrying basket 34 may be hung by a handle 90 upon each of hooks 88.

Carousel 44, receptacles 36 and 40, and baskets 34 are all enclosed within a housing 22 (shown schematically) having a top 91 and a hexagonal shape such that each wall 92 thereof faces one of the receptacles. Wall 92 facing oil-holding receptacle 36 includes a door 94 shown in an open condition for providing access to the inside of housing 22, so that basket 34 may be hung above oil-holding receptacle 36. Vent 24, including an unpictured fan or similar means, draws air from inside housing 22 so that fumes heretofore described are vented.

Door 94 includes a window 96 which allows viewing of the inside of the housing 22 and therefore monitoring of carousel operation when door 94 is closed. Each of the remaining five unpictured walls of housing 22 includes such a window.

Figure 3:
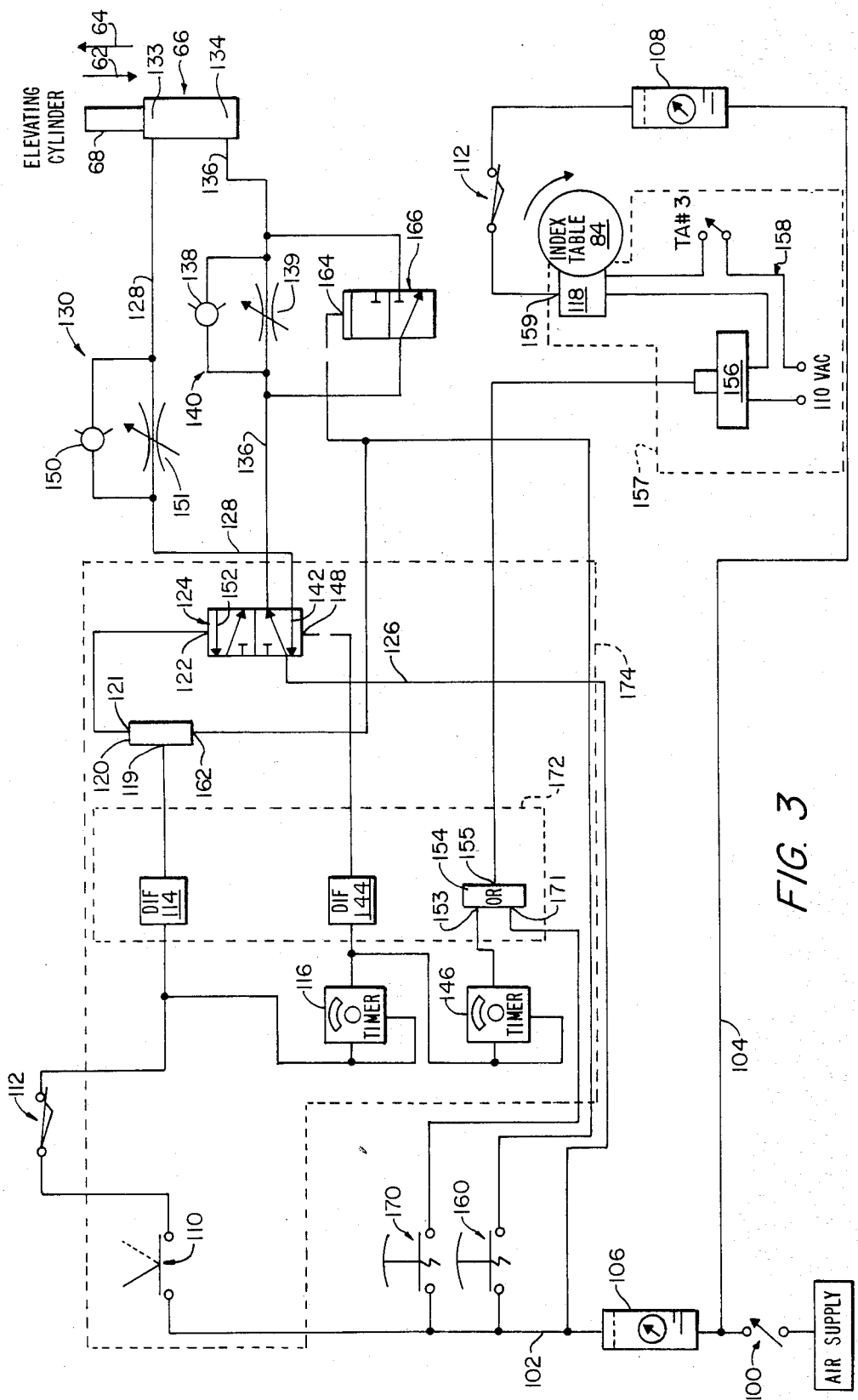
FIG. 3 is a schematic view of a pneumatic system for operating the apparatus of FIG. 3.

A pneumatic system for operating carousel 44 is shown in FIG. 3. An on/off valve 100 selectively supplies or cuts off a supply of air at 60 psi working pressure to the system. When an "on" condition is selected, air flows through valve 100 into a line 102 and into a line 104. Unit 106 includes a filter, regulator and lubricator for filtering and adjusting the flow of air through line 102 and supplying a lubricated air supply therethrough. Unit 108 includes a filter, regulator and lubricator for providing a filtered, adjusted and lubricated flow of air through line 104. An on/off valve 110 is provided to selectively permit or cut off the flow of air through line 102.

A limit valve 112 receives air inputs from either of lines 102 or 104. Consequently, valve 112 is illustrated twice, in both line 102 and line 104. Valve 112 is operated by opening or closing the housing door 94, FIG. 2. When the door is closed, and on-off valve 110 is open, valve 112 is actuated to permit an air input to be delivered to differential valve 114 and timer 116, whereas when the door is opened valve 112 is operated such that an air input is delivered to a electromagnetic pneumatic valve 118.

Assuming that one of the baskets 34 illustrated in FIG. 2 is hung upon a support arm hook 88 and that the door 94 is closed, air under pressure, FIG. 3, is enabled by valve 112 to provide an input to activate timer 116 and an input to activate differential valve 114. Valve 114 responds by delivering a momentary pulse to the input 119 of a shuttle valve 120. Valve 120 acts as an OR gate (also responding to a pneumatic signal at input 121 as explained hereinafter) to produce an output of air at 121 which is delivered to input 122 of double-pilot valve 124. Upon receiving this air from shuttle valve 120, pilot valve 124 is actuated to connect a lubricated air supply line 126 with a line 128. Lubricated air from line 126 thus flows through line 128 and, without hindrance, through flow control 130. Air flows into the upper portion of cylinder housing 66, thereby driving the obscured piston accommodated within cylinder housing 66, in the downward direction of arrow 62. The connecting rod 68 and upper tower portion 56 of carousel 44, FIG. 2, are similarly driven downwardly. Air in the lower portion 134, FIG. 3, of cylinder housing 66 is expelled by the descending piston from cylinder housing 66 through line 136. Check valve 138 and restrictor 139 of flow control 140 restricts the passage of air therethrough, thereby enabling a gradual controlled descent of the piston within cylinder housing 66. The upper tower portion 56, FIG. 2, is thus allowed to drop easily rather than suddenly, and damage to the tower and carousel, and splashing of the liquid, is avoided. As shown in FIG. 3, the expelled air is then discharged through exhaust port 142 of pilot valve 124.

The activated timer 116 remains set for a predetermined time, typically one to three minutes, during which time the piston remains in a lowered condition within cylinder housing 66. Following timing out, timer 116 provides an air input to a differential valve 144 and a second air input to activate a second timer 146.

Differential valve 144 responds by delivering a momentary pulse to input 148 of double-pilot valve 124. Such an input activates valve 124 to connect lubricated air supply line 126 with line 136. Air flows through line 136 and freely through flow control 140 into the lower portion 134 of cylinder housing 66. The obscured piston, and thus connecting rod 68, are forced upwardly in the direction of arrow 64. Air in the upper portion 133 of cylinder housing 66 is expelled through line 128. Check valve 150 and restrictor 151 of flow control 130 restrict the passage of air therethrough so that the rate of air discharge, and thus piston ascent, is controlled. Upper tower portion 56, FIG. 2, therefore also rises in a gradual controlled, rather than a sudden, fashion. Air is exhausted via exhaust port 152 of pilot valve 124, FIG. 3.

Activated timer 146 meanwhile counts down a predetermined time, typically of ten to thirty seconds duration, during which the piston and the upper tower portion are in a raised position. Oil or solvent in which the chips have been immersed during the previous lowered stage is allowed to drain therefrom during this time period. Upon timing out, timer 146 provides an air input to input 153 of OR gate 154. An output is provided from OR gate 154 at 155 to activate a pneumatic microswitch 156 in pneumatic/electrical interference system 157, and thereby close an electric circuit 158 to open electromagnetic air valve 118. Assuming that the piston and upper tower portion have been raised, as heretofore described, door 94, FIG. 2, is now opened to remove a basket 34 of chips from a support arm 86 of upper tower portion 56, and replace that basket 34 with a fresh basket of chips to be dehydrated. Accordingly, limit valve 112, FIG. 3, is actuated to permit an air input to be provided to electromagnetic pneumatic valve 118 at 159. Opening of valve 118 by closed electrical circuit 158 permits lubricated air received at input 159 to be passed through valve 118 in order to advance index table 84 one position: the radial arrangement of support arms 86, FIG. 2, is rotated a 1/6 turn so that each basket 34 hung thereon is positioned over a subsequent receptacle. For indexing to occur, two conditions must be met: the door must be opened, and timer 116 must have timed out its predetermined time.

Under certain conditions, such as undesired ignition of the chips, it may become desirable to drop the piston and upper tower portion instantaneously so that the chip-carrying baskets 34, FIG. 2, are dropped immediately into the fluids therebelow. Accordingly, as shown in FIG. 3, a fast retract switch 160 may be closed to deliver a momentary air pulse output to input 162 of shuttle valve 120 and to input 164 of a single-pilot valve 166. Shuttle valve 120 responds to such an air input by delivering an output to input 122 of pilot valve 124. Valve 124 is thereby connected, as heretofore described, with air supply line 126, to permit unobstructed air delivery to the upper portion 133 of cylinder housing 66. Valve 166 is meanwhile actuated to permit air being discharged from the lower portion 134 of cylinder housing 166 to shunt flow control 140 and to pass therethrough and flow in an unobstructed fashion for discharge through exhaust port 142 of double-pilot valve 124. Sudden, nonrestricted dropping of the piston within cylinder housing 66 is thus enabled.

An index override switch 170 may be activated to deliver a momentary air signal to input 71 of OR gate 154, which responds to such a signal by providing an output to activate pneumatic microswitch 156 and thus advance index table 84 when the apparatus door is opened in the heretofore described manner. Accordingly, the index table 86 and carousel 44 may be indexed independently of the timing out of timer 146, FIG. 3.

Differential valves 114 and 144, and OR gate 154, are included in a pneumatic module 172 as an integrated unit. Module 172, as well as on-off valve 110, timers 116 and 146, shuttle valve 120, and double-pilot valve 124, are all included in a control panel 174.

Figure 4:
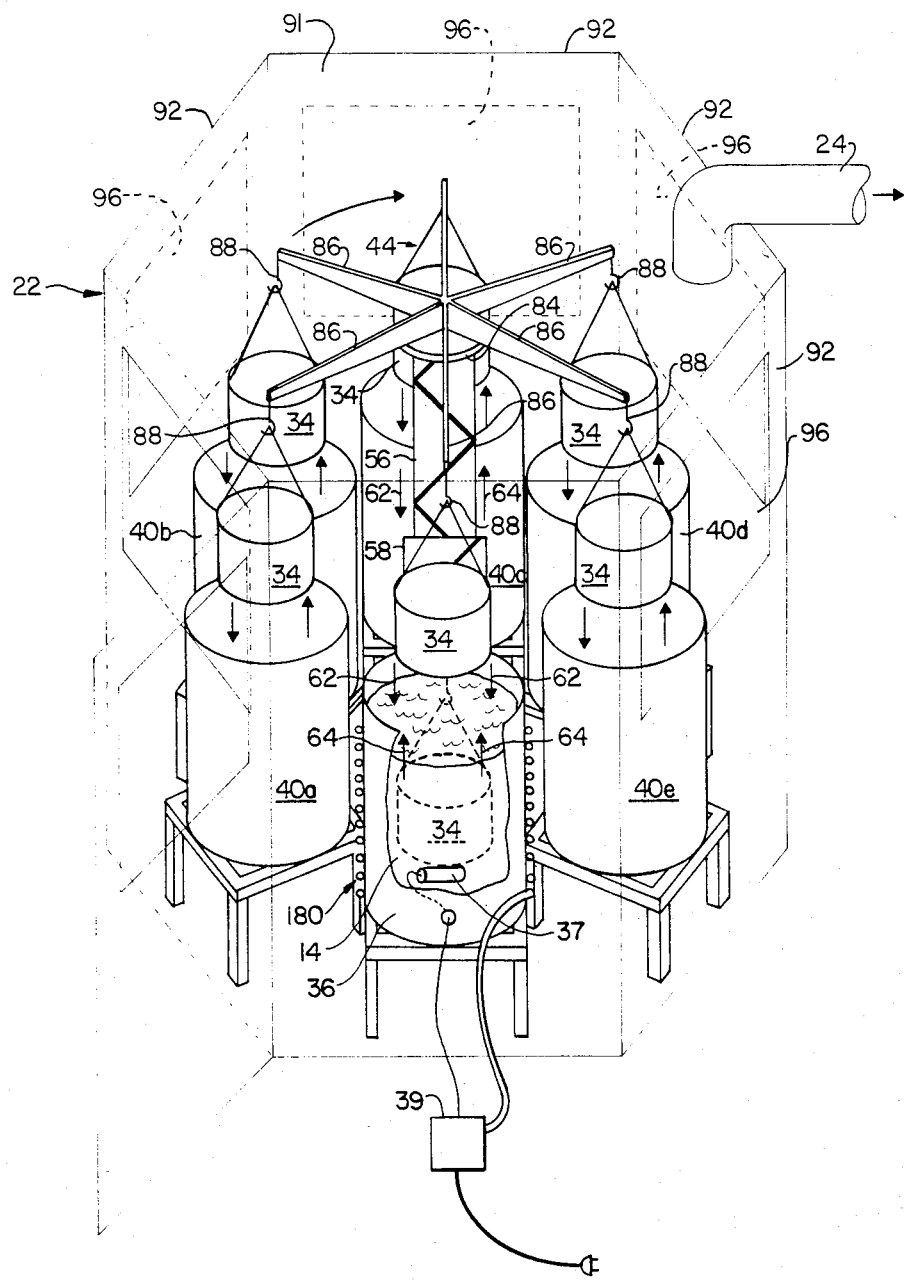
Fig. 4 is an axonometric cutaway view illustrating the apparatus for dehydrating metal pieces according to this invention.

As shown in FIG. 4, a basket 34 may be hung from each hook 88. Oil-holding receptacle 36 is wrapped in a heating coil 180 which may be activated by conventional means to heat the vegetable oil bath 14 therein to the boiling point of water. Typically, under normal atmospheric pressure conditions, such oil 14 is heated beyond boiling temperature (212 degrees Farenheit) to approximately 300-320 degrees Farenheit. The oil temperature is monitored by an immersed thermocouple 37 (or other thermostatic device). In response to thermocouple 37, switching device 39 controls the delivery of power on line 41 to heater 180.

Apparatus 12 is operated as follows: Initially, all hooks 88 are unoccupied by baskets. The door of housing 22, which faces oil holding receptacle 36 and is cut away and omitted for clarity, is opened, and carousel 44 is in the raised condition. A basket of water-coated metal chips is hung on the support arm hook 88 above receptacle 36 in the manner heretofore described. The housing door is then closed, causing tower portion 56, arms 86, and thus basket 34, to be lowered in the direction of arrow 62 so that basket 34 is introduced into the oil bath 14 and the chips are immersed therein. Following the timing out of timer 116, FIG. 3, tower portion 56, FIG. 4, is raised in the direction of arrow 64 and the chips are removed from the oil. The second timing sequence times out a period during which the chips in basket 34 drain excess oil therefrom. The housing door is again opened and, if the second timing sequence has been completed, index table 84 is rotated to advance basket 34 to above receptacle 40a, which contains oil-removing trichloroethane solvent. A fresh basket 34 of water-coated chips is then hung upon the vacant hook 88 above oil-holding receptacle 36. The door is again closed and the process repeated: the basket 34 which had been previously introduced into oil 14 is now lowered, in the direction of arrow 62, into the solvent in receptacle 40a so that oil is removed from the chips held therein. The fresh basket 34 is contemporaneously lowered into oil 14. Timer 116, FIG. 3, determines the immersion time for both baskets 34, and timer 146 determines the subsequent drain time for each basket after the baskets have been raised. This process is repeated four more times, until, as shown in FIG. 4, all hooks 88 are occupied by baskets 34.

After being lowered into and raised from, and sequentially advanced through, oil-holding receptacle 36 and five solvent-holding receptacles 40a-e, each basket is finally advanced, by opening the housing door, to its initial position above oil-holding receptacle 36. At this point the water coating the chips in the basket 34 has been boiled off and the residual oil has been removed by the five solvent baths. Basket 34 is thus removed from hook 88 over receptacle 36, and replaced by a fresh basket 34 of water-coated chips. Operation of apparatus 12 continues in this manner: as carousel 44 is lowered, a single basket 34 is immersed in a water-removing oil bath 14 and five baskets 34 are immersed respectively in the five solvent-holding receptacles 40a-e. Carousel 44 is then raised to raise the six containers and indexed so that each container is positioned above a subsequent receptacle.

Windows 96 in each wall 92 allow the immersion and removal steps at each receptacle 36, 40 to be closely monitored. Vent 24 permits steam and solvent fume-filled air to be removed from the housing.

Other embodiments will occur to those skilled in the art and are within the following claims:

What is claimed is:

1. Apparatus for dehydrating metal pieces comprising:
   a container for carrying pieces to be dehydrated;
   a receptacle for holding oil in which said pieces are to be immersed;
   means for heating said oil to the boiling point of water; and
   means for introducing said container into said receptacle to immerse said pieces in said oil and for removing said container from said oil.

2. The apparatus of claim 1 in which said container is foraminous.

3. The apparatus of claim 1 in which said means for introducing includes means for raising and lowering said container.

4. The apparatus of claim 3 in which said means for introducing further includes means for advancing said container beyond said receptacle after it is raised out of said receptacle.

5. The apparatus of claim 3 further including means for timing the immersion period when said container is in the lowered position in said receptacle.

6. The apparatus of claim 5 further including means for timing the drainage period when said container is in the raised position.

7. The apparatus of claim 1 further including at least one additional receptacle for holding a solvent for removing the oil from said pieces.

8. The apparatus of claim 7 in which said means for introducing further introduces said container to and removes it from each additional receptacle for holding solvent.

9. The apparatus of claim 7 further including a housing surrounding said container and said at least one receptacle.

10. The apparatus of claim 9 further including venting means for removing air from said housing.

11. The apparatus of claim 1 in which said means for introducing includes elevating means for raising and lowering said container and indexing means for advancing said container between receptacles.

12. The apparatus of claim 11 further including means for timing the immersion period when said container is in a lowered position in a said oil or solvent holding receptacle.

13. The apparatus of claim 11 further including means for timing the drainage period when said container is in the raised position.

14. The apparatus of claim 11 in which said receptacles are arranged in a circular path and said means for indexing provides rotational motion.

15. The apparatus of claim 1 in which said oil is vegetable oil.

16. The apparatus of claim 7 in which said solvent is trichloroethane.

17. Apparatus for dehydrating metal pieces comprising:
   a container for carrying pieces to be dehydrated;
   a receptacle for holding oil in which said pieces are to be immersed;
   means for heating said oil to the boiling point of water;
   at least one additional receptacle for holding a solvent for removing the oil from said pieces; and
   means for introducing said container into said receptacle holding said oil and sequentially into each additional receptacle holding said solvent.

18. Apparatus for dehydrating metal pieces comprising:
   a number of containers for carrying chips to be dehydrated;
   a receptacle for holding oil in which said chips are to be immersed;
   means for heating said oil to the boiling point of water;
   at least one additional receptacle for holding a solvent for removing the oil from said chips; and
   means for introducing each said container into and removing it from said receptacle holding said oil and sequentially into each additional receptacle holding said solvent.

19. A method of dehydrating metal pieces comprising: introducing said pieces into an oil heated to the boiling point of water to boil off the water; and removing said pieces from said oil.

20. The method of claim 19 further including introducing said pieces at least once into an oil removing solvent to remove the oil from the pieces and then removing said pieces from said solvent.

21. The method of claim 20 further including draining said pieces of oil before introducing them to the solvent.

22. The method of claim 21 further including draining said pieces of solvent after they are removed from the solvent.

23. The method of claim 20 further including drying the pieces of the solvent.

24. The method of claim 19 in which the oil is vegetable oil.

25. The method of claim 19 in which the solvent is trichloroethane.

26. Apparatus for dehydrating metal pieces of the group which includes uranium, magnesium, titanium and zirconium, comprising:
   a container for carrying pieces to be dehydrated;
   a receptacle for holding oil in which said pieces are to be immersed;
   means for heating said oil to the boiling point of water; and
   means for introducing said container into said receptacle to immerse said pieces in said oil and for removing said container from said oil.

27. A method of dehydrating metal pieces of the group which includes uranium, magnesium, titanium and zirconiium, comprising: introducing said pieces into oil heated to the boiling point of water to boil off the water; and removing said pieces from said oil.

* * * * *